United States Patent
Harman et al.

[11] 4,300,174
[45] Nov. 10, 1981

[54] GUARD BAND CONTROL FOR MAGNETIC DISKS

[75] Inventors: Jefferson H. Harman, Thousand Oaks; G. Randall Stevens, Inglewood, both of Calif.

[73] Assignee: PerSci, Inc., Los Angeles, Calif.

[21] Appl. No.: 105,894

[22] Filed: Dec. 21, 1979

[51] Int. Cl.³ .............................................. G11B 21/08
[52] U.S. Cl. ........................................ 360/78; 360/66
[58] Field of Search ................. 360/78, 66, 77, 97–99, 360/135; 318/561, 594, 632, 687

[56] References Cited

U.S. PATENT DOCUMENTS 4,133,011  1/1979  Kurzweil, Jr. ......................... 360/78
4,237,502  12/1980  Erickson, Jr. et al. ............... 360/78

Primary Examiner—John H. Wolff
Attorney, Agent, or Firm—Smyth, Pavitt, Siegemund & Martella

[57] ABSTRACT

The tunnel-erase-type guard band "writing" along the tracks of a disk in a disk file is controlled by the same microcomputer which controls transducer repositioning in the seek mode. The micro-computer meters different delays for onset and cessation of erasing in relation to a signal (write gate) accompanying the data to be recorded; and these delays are longer for tracks having smaller diameters. The leading and trailing edges of the write gate signal trigger interrupts for the microcomputer, the interrupt channel is released only after the particular delay has been metered.

12 Claims, 3 Drawing Figures

GUARD BAND CONTROL FOR MAGNETIC DISKS

BACKGROUND OF THE INVENTION

The present invention relates to the recording of information, preferably digital information on a disk, such as a magnetizable, possibly flexible disk of the type sometimes referred to as a floppy disk.

Information is recorded on any disk, usually by means of a transducer and in concentric tracks. The transducer is mounted on a radially movable arm, but holding its position while information is recorded on, or read from, a circular track of the spinning disk. In order to separate the tracks from each other, it is customary to inscribe so-called guard bands alongside the tracks, which bands are established by erasing any information as it may extend beyond a particular track width. Thus, guard bands are actually "written" by erasing, so that the recording tracks are separated by record-free bands, the guard bands. If the information on one track were allowed to extend into the zone between the two tracks, it may well interfere, for example, with the reading of the other one of the two tracks.

Erasing and providing of guard bands is usually carried out by means of one of two methods, respectively called straddle erase and tunnel erase. Straddle erase involves a transducer structure in which the information record transducer is disposed in between two erase transducers, the gaps being more or less aligned (in radial direction with regard to the disk). This type of assembly is disadvantaged by the fact that erase-transducer and record-transducer energization do both interfere with each other, at least to some extent.

A better approach is the tunnel erase, in which the information is recorded first, and the guard bands are inscribed downstream by means of erase transducers which are azimuthally displaced from the information record transducer; in other words, the erase transducers erase a little downstream from the area of the disk being recorded on. The present invention relates particularly to the timing of the operational control of these erase transducers for the tunnel erase.

DESCRIPTION OF THE INVENTION

It is an object of the present invention to improve the generation of guard bands and particularly the accuracy of their generation in disk file systems.

It is a specific object of the present invention to provide a control circuit for guard band generation in disk file systems, wherein a transducer for information writing is disposed between two guard band transducers which write the guard bands along the recorded information, but in locations downstream from the location of information writing, the information writing transducer receiving digital information for recording accompanied by a write-gate signal.

In accordance with the present invention, it is suggested to provide, or to use if available otherwise, digital information in the drive system identifying the track above which the information-write transducer is located, and to derive therefrom incremental delay periods which are the longer, the shorter the radial distance of the track is from the disk center; one of the two different constant delay periods is added to the track-radius-dependant period, to arrive at a first or a second delay period, each of which depends on the current track, accordingly. As the write gate signal is received, accompanying the data to be recorded, the appropriate first delay period is generated at that point in time and used to turn on the guard band transducers, while the second delay period is generated at the end of the write-gate signal to turn the guard band transducers off.

In the preferred embodiment of the invention, the delays are generated by a microcomputer which receives a change in state of the write-gate signal level as an interrupt, and program means identify the direction of the change to generate the first or second delay period as the case requires. The microcomputer is used during track changing (seek) operation to generate the requisite speed command for a motor driving the carriage on which the transducers are mounted. These track-changing operations are described in Ser. No. 056,243, filed July 10, 1979, now U.S. Pat. No. 4,237,502 of one of us and another, having common assignee. The content of this application is incorporated by reference. As described in said application, the microcomputer generates speed command signals also on the basis of interrupts, resulting (a) from so-called step pulses by means of which the host equipment (furnishing the information to be recorded) commands a track change, and (b) from so-called detent pulses by means of which the carriage signals back the passage of the transducer, radially across the tracks on the disk. These seek and transducer-positioning operations are not the subject matter of this invention, but the present invention makes use of the fact that during data recording, a speed command signal is not generated, and detent and step interrupt pulses are not received. Thus, the microcomputer which normally controls the carriage and transducer repositioning is free to perform other tasks when the carriage and transducer are retained and remain in the position above the chosen track, which is digitally identified in a storage facility of the microcomputer. This identification is used by the microcomputer as it responds to write-gate signal level changes as a third cause for an interrupt, to meter the requisite delays for guard band writing by means of software counting.

It is, therefore, another object of the present invention to improve disk drive systems as generally referred to above and having a microcomputer for the generation of speed command signals when the transducers are to be rapidly repositioned to face a different track whereby specifically the microcomputer processes asynchronously received pulses representing track-changing commands and pulses representing track-crossings by the transducer, which pulses are used as interrupts by the microcomputer. The invention uses that microcomputer during data recording when track changes do not take place.

The guard band generation as per the present invention permits placing the beginning of the guard bands just a little ahead of the new information as it is recorded, and at a high resolution of accuracy, to avoid encroaching on information and their guard band on the same track, but preceding (in the direction of rotation) the track portion (sector) allotted to the information to be newly recorded. Analogously, guard band writing ceases just a little beyond the end of the track portion just having been recorded on. These two precautionary measures are necessary because one does not necessarily rewrite a track completely; different portions thereof are usually recorded at different times and positioning tolerances may cause occasionally the track segments to be misaligned azimuthally.

Due to the track radius dependancy of the onset and cessation of guard band writing, one takes care of the fact that the linear speed of the disk vis-a-vis the transducer increases with the track radius, while the azimuthal distance between information transducer gap and the gaps of the guard band transducers remains necessarily constant, so that a shorter period of time is required for a point on a more outer track to cover the azimuthal distance between the record and erase gaps.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

FIG. 3 is a signal diagram.

Proceeding now to the detailed description of the drawings, FIG. 1 shows a flexible, magnetizable disk 10, which is driven by a motor 11 for spinning at a constant speed. The disk cooperates with a transducer assembly 12, which includes a transducer 13 to be used for writing and for reading, but only the write phase and aspect is presently of interest. The transducer assembly includes further a pair of erase transducers 14 and 15, which are disposed respectively on both sides of transducer 13 to erase excess recordings along the track, thereby "writing" the guard bands along the track. The two transducers 14 and 15 are azimuthally displaced from transducer 13, i.e., they are disposed downstream from the data write transducer in the sense that excess recordings in the guard band area are erased in any instant in locations being rearwardly displaced from the location in which the actual recording by transducer 13 takes place.

Figure 1:
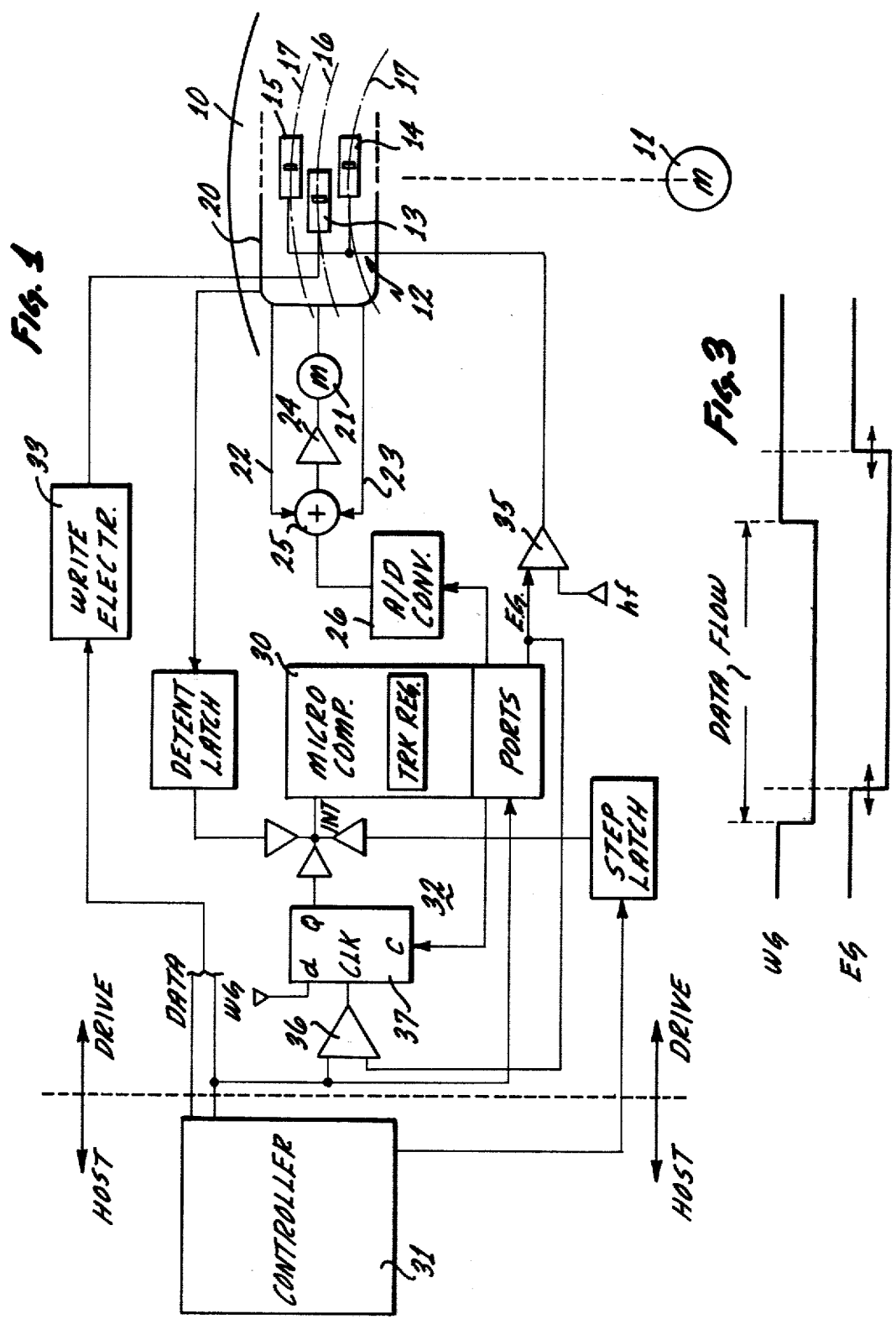
FIG. 1 is a block diagram of relevant portions of a disk drive system improved in accordance with the preferred embodiment of the present invention; the figure shows also a schematic top view of a portion of the disk in the system and of transducers cooperating therewith.

The transducer assembly, 12, is mounted on a movable arm which is mounted to, and actually constitutes a part of, a carriage 20. Carriage 20 can move in radial direction, as far as disk 10 and its center are concerned, to position transducers 12 above any particular track and to move the transducers to a different track if necessary.

Carriage 20 is driven by a motor 21, preferably a so-called voice coil motor, and the motor is under control of two feedback loops and control circuits 22 and 23, both including a motor driver and amplifier 24 as well as a summing point 25. The first circuit, 22, is a so-called positioning and hold loop, whose input is a position error signal derived from carriage 20 by means of a grating, which is well known. An amplified position error signal is fed to the summing point, 25, to control motor 21 for holding transducer assembly 12 above the chosen track.

The second feedback loop, 23, receives a speed feedback signal from transducer carriage 20 as well as a speed command signal. The speed command signal is furnished by an analog-to-digital converter 26 which, in turn, receives a digital command signal from a microcomputer 30.

This second, speed feedback loop 23 is put into operation for a so-called seek operation, whenever transducer assembly 12 is to change position on a different track. As soon as transducer 13 of assembly 12 has arrived above the new data track, the first and hold loop 22 takes over, and speed loop 23 remains idle. Microcomputer 30 does not generate any speed command signal during the hold phase, but may actively maintain a zero speed command as input for summing point 25. Any position-correcting motion of the carriage in radial direction during the hold phase is produced only by the hold loop without participation of the microcomputer. During this hold phase, a read and/or write operation will take place, i.e., transducer 13 will receive information for recording on the particular track of the disk, or this transducer (or another one) will read information from that track.

The speed command signal is generated by the microcomputer in response to two sets of pulses. One set of pulses, commonly called "detent pulses," is derived from carriage 20 and represents the number of tracks transducers 12 have crossed during any repositioning. The second set of pulses, commonly called "step pulses," are furnished by a host equipment, such as a controller 31. Upon issuing a series of such step pulses, controller 31 commands the drive unit to move the transducers by as many tracks as step pulses are issued. The microcomputer generates the speed command signals from these pulses. Shortly after carriage 20 has begun to move, detent pulses begin to arrive to signal track crossings on account of the radial movement. The respective current speed command depends upon the difference between the number of step pulses and the number of detent pulses as received thus far in that particular instant. Usually, the speed command is approximately proportional to the square root of that difference.

After the microcomputer has received as many detent pulses as step pulses, transducer 13 has arrived above the new track (i.e., it has crossed as many tracks as it was supposed to) and the resulting counted pulse difference is zero; the microcomputer will issue a zero speed command signal accordingly, and the system shifts into the hold mode. The microcomputer also generates the requisite mode control signals, whereby a seek mode signal enables speed loop 23 for carriage motor 21 and a hold-mode signal enables position loop 22.

The detent and step pulses, out of which microcomputer 30 generates the speed command signal, arrive asynchronously and independantly. They are acquired by the microcomputer through interrupt operations. Particularly, each detent or step pulse is fed to an interrupt circuit 32, in which it is stored in a latch until the respective latch is reset; two latches are required for separately receiving detent and step pulses. Each latch, when set, drops the common interrupt input line INT for the microcomputer, which interrupts its current program and interrogates the cause for the interrupt. A step pulse is added to the number from which the speed command will be derived, a detent pulse is subtracted from that number. That number representing the difference between step and detent pulses is held in a particular register in the microcomputer. After the host has issued the requisite number of step pulses, the content of that register represents the number of tracks the transducers still have to cross before arriving at the desired tracks. The detent pulses reduce the number to zero by subtraction. In addition, the microcomputer has a register which holds a digital representation of the desired track, using any convenient scale in that, e.g., one track is identified by 0, and those of smaller radius are identified by a negative number, while those of a larger radius are identified by a positive number. The reasons for such a choice are unrelated to the present invention. For the purpose of this invention, it is only necessary that the microcomputer holds a digital representation, defining the current track position of the transducers.

The interrupts, on account of detent and step pulses, occur during a seek operation when the transducer is relocated. Neither reading nor writing of data takes place while the transducer is repositioned. Reading or writing of data will begin, however, as soon as the transducer, 12, is centered above the new track. The system is then placed into the hold mode and detent or step pulse interrupts do not occur (if they do, there is an error).

Transducer 13 is connected to the host equipment via a write-control circuit 33, including an amplifier which drives transducer 13 as to its current flow. Write-control circuit 33 is connected to a data line leading from host/controller 31, to receive therefrom digital signals for recording, and to convert, for example, regular binary-type (bi-valued) signals into the desired recording format (Manchester, modified Miller, tri-valued period, etc.). The data flow from the host equipment is accompanied by a so-called write gate signal WG, which enables write control 33 for the duration of the data flow (see also FIG. 3).

The two erase and guard band write transducers 14 and 15 are controlled during data writing by means of an amplifier 35, which includes a gating structure to apply DC-signals to these two transducers to obtain the desired erasing. Microcomputer 30 determines the duration of the erasing. Accordingly, the control input of amplifier 35 is connected to one of the output port lines of microcomputer 30, to receive therefrom an enabling signal. This signal could be called "erase gate" signal, or EG for short, and is generated in the following manner.

As stated, the period of recording is defined by the so-called "write gate" signal, or WG, which is issued by the host equipment and data source 31, accompanying the stream of data to be recorded. The signal WG turns, e.g., true (i.e., goes down), just a little ahead of the first data bit and goes false (i.e., up) with the last bit. In addition to controlling the write electronics 33, the write gate signal is used to control guard band writing or erasing, in that the enabling erase gate signal EG is derived from the WG signal by operation of microcomputer 30.

During data recording or retrieval, carriage 20 and its control is in the hold mode, which the microcomputer maintains as a steady signal in one of the output ports and reaffirms it in continuous loop operation. Development of a speed command signal is not needed. Thus, the microcomputer is available to control the timing of guard band writing by particularly phasing signal EG to signal WG.

The write gate signal WG is applied to one input line of a part of microcomputer 30. At appropriate times, the microcomputer, through its program, will interrogate the signal level on that line. Conceivably, the change in signal level could be detected through frequent, e.g., periodical, interrogation of that line while the program runs through a regular loop. However, it is preferred to use the write gate signal level change as an interrupt.

As shown in FIG. 1, the write gate signal line is also connected to an Exclusive Or gate 36, which has its second input connected to the output port line providing signal EG. Thus, the output of gate 36 turns true only when the two input signals are unequal, and false when they are equal; true or false, as the case may be.

The output of the exclusive or gate 36 is connected to the clock input of flip flop or latch 37, which is a part of the interrupt input circuit and constitutes the third interrupt latch. The Q-output of latch 37 is, accordingly, also connected to the interrupt input INT of the microcomputer. The d-input of latch 37 is permanently set true. Thus, the latch is turned on, whenever the exclusive or gate 36 responds to an inequality of its inputs. An inequality of these inputs exists when the write gate signal goes down while EG is still up, and also when the write gate signal goes up again while EG is still down. The interrupt of latch 36 is, therefore, set whenever the write gate signal changes state on condition that the erase gate signal is at a different level. If not, this is not necessarily an error situation; but this will be dealt with below as a special circumstance.

Throughout the seek period and operation, and, actually, during any period of time in which host equipment 31 does not issue data for recording, the write gate signal level will be high (=false). Also, the drive-developed companion signal EG is high; there is, of course, no erasing by transducers 14 and 15 during transducer relocating or during a data read operation.

Latch 37 is cleared (clock-independant reset) by an output from the microcomputer, derived from one of its port lines. The interrupt latches generally are cleared whenever the respective interrupt has been processed by the microcomputer.

The microcomputer responds to the write gate interrupt and produces the erase gate signal EG is particularly timed relation to the write gate signal. The timing is chosen, so that the guard bands begin with the data track as it is being written, and the guard bands end with the data proper as recorded. This is accomplished in the following manner.

We may assume that the system has just completed a seek mode operation, transducer assembly 12 has arrived above a new track, and additional step or detent pulses will no longer arrive. Microcomputer 30 has signalled this arrival to host equipment 31 which, when ready, will, for example, provide data for recording, and so the write gate signal will go down. Accordingly, exclusive or gate 36 receives unequal inputs at this point and sets the interrupt flip flop 37 to raise the interrupt line INT. Other interrupt inputs will not be present at this time because by definition, after the completion of the seek mode, the host will not issue step pulses until it has completed the task which led to and was preceded by a repositioning of the transducers. Additional detent pulses will likewise not occur unless the transducers stray from the required track alignments. This represents an error situation and leads to the development of one or more detent pulses during the hold mode. Such a detent interrupt is processed by the microcomputer in that the detent pulses have a higher priority than the write gate interrupt pulses, so that such an error situation can be identified immediately and, for example, any recording must be immediately halted. The above-mentioned patent application describes details on this point. Presently, it is assumed that the write gate interrupt for flip flop 37 is the only interrupt present and results from the beginning of a write gate signal.

Figure 2:
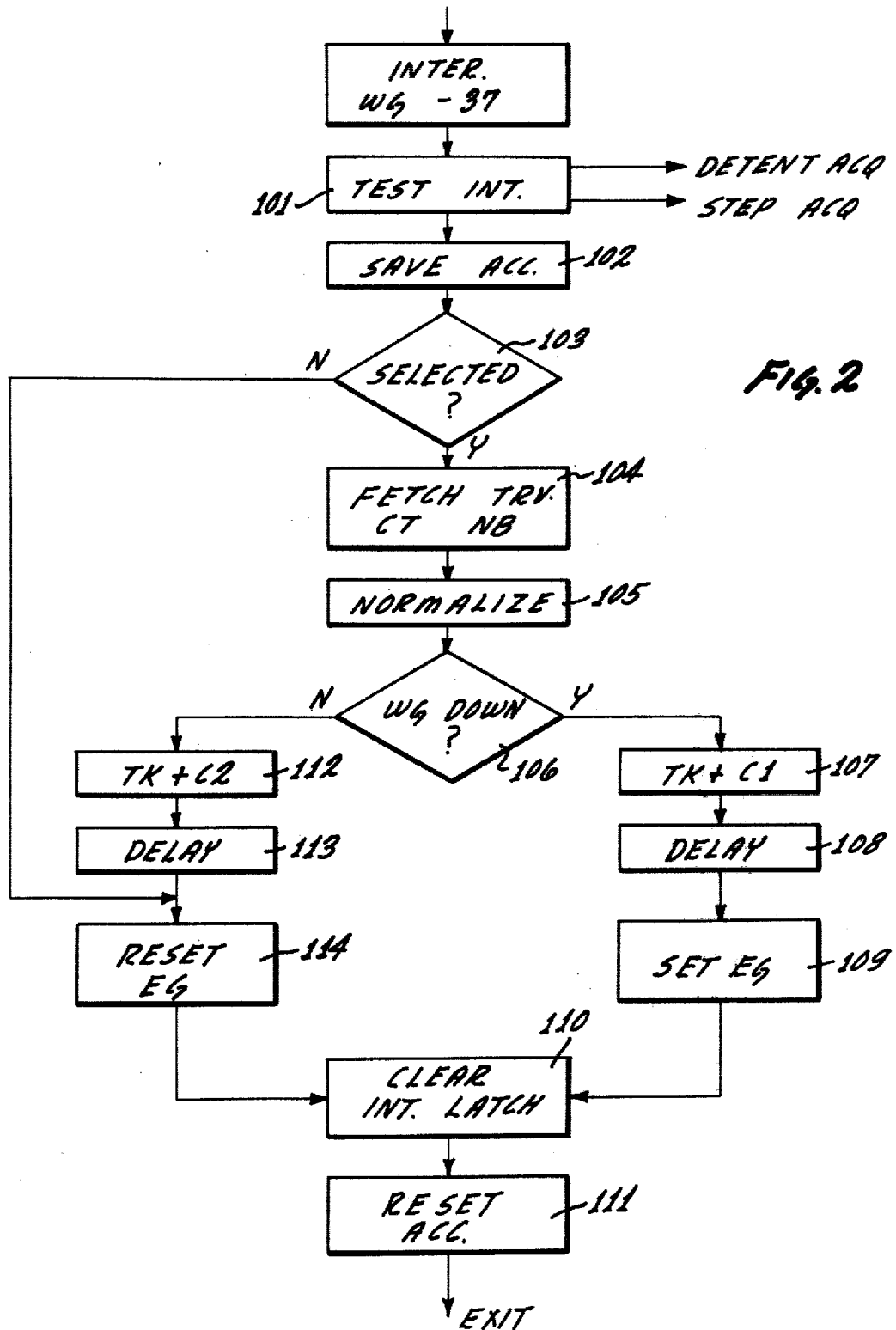
FIG. 2 is a program chart used for explaining the operation of the system shown in FIG. 1 as far as the improvement in accordance with the invention is concerned.

Turning now to FIG. 2, microcomputer 30, upon receiving the write gate interrupt, will determine the cause for the interrupt; and in the present case, this test will necessarily result in a determination that the interrupt was caused neither by a detent pulse nor by a step pulse, so that, indeed, the interrupt signals a change in the write gate signal (101).

In accordance with the program, the current content of the accumulator is saved (102), whereupon the microcomputer determines whether or not the drive has been selected (103). The host equipment may service more than one drive, but the write gate signal is nonspecific as to the several drives. Thus, the signal WG is destined to the particular drive if the drive was, in fact, selected by the host. The selection process is described in the above-identified application and involves response by the drive to a selection signal from the host. This is mentioned for reasons of completion only and selection is, of course, assumed.

The program extracts the track number from the appropriate memory, or register location, in the microcomputer. As stated above, the particular track under transducer 13 is identified by a number which has stored and is so identified in the microcomputer. This identification has been arrived at previously by adding (or subtracting) the number of step pulses previously received to the number defining the previous position of the transducer. It was also mentioned that the track number may, for other reasons, not necessarily be a number within a simple sequence of numbers, beginning with the innermost (or the outermost) track as number 1, etc. Thus, it is necessary to augment the track number as stored, i.e., normalize it, to obtain a number in which the outermost track is identified by 0, with ascending numbers used to identify the more radially, inwardly located tracks (105).

Next (106), it is determined whether or not the write gate signal is up or down. It will be recalled that the write gate signal line is also connected to one of the port input lines of the microcomputer. This line is normally ignored, but now, during this particular interrupt acquisition routine, the state of that line is inspected to determine whether the interrupt was caused by the beginning or by the end of write gate signal (and data flow).

Assuming that the interrupt is to signal the beginning of writing (WG down), the program branches to 107, according to which the microcomputer forms a number which is equal to a sum composed of a number equal to, or proportional to, the normalized track number ($T_k$) to which a costant value CI has been added. This resulting number is necessarily smaller for the outer track than for those closer to the disk center because, as stated, the outermost track is identified by $T_k=0$, and the innermost track is identified by a number which is equal to the total number of data tracks minus 1.

It should be mentioned that in the actual implementation, the track dependant number used $T_k/2$, while dropping the fraction (i.e., one ignores the least significant bit), so that the delay now to be metered is the same for two tracks. Such a reduced resolution amply suffices.

Another point is the following. The number ultimately identifying the requisite delay is actually a linear approximation of a hyperbolic relation. The correct delay is mathematically inversely proportional to the track radius. Thus, the delays (in time), which are intended to cover precisely the same azimuthal distance for all tracks, would require the conversion of the track number into a number that is inversely proportional to the track radius, to be multiplied by a number which reflects (inversely) the RPM number and (directly) the particular azimuthal distance in question.

However, the linear approximation was found to be quite adequate for the type of floppy disks currently in use. The more accurate approach may be needed for disks with a higher package density, greater division into records and sectors, and for a larger range of track diameters. Instead of calculating the delay each time, one could use a ROM table which leads from a track number (even the unnormalized one) directly to a delay.

In the present case, the outermost track is identified by $T_k=0$, Therefore, the constant CI represents the period of time that elapses between the beginning of writing and an instant just ahead of the instant in which the beginning of the recorded information passes adjacent to the leading edge of the erase transducer. Data writing begins at the trailing edge of the write transducer, so that CI is a little shorter than a period equal to the distance between the trailing edge of data write transducer gap and the leading edge of the erase transducer gaps divided by the linear speed of the outermost track. For tracks being located more radially inwardly than the outermost ones, that delay period is longer, so that the beginning of erase (erase delay) is delayed longer on more inward tracks than for the more outer ones. The delay determining the beginning of guard band erase (erase delay) is, thus, generated by the program, individually for each track.

The next program step (108) performs the actual metering of the requisite delay, by an internal, software-counting operation, reducing the number $T_k+CI$ to zero, whereupon the microcomputer generates the signal EG. Accordingly, gate 35 is now opened and erase transducers 14 and 15 are turned on to begin erasing (step 109). The erase gate signal EG is also applied to the exclusive or gate 36 which, therefore, receives again two similar signals and turns false accordingly. The erase gate signal, therefore, serves as a gating signal, so that exclusive or gate 36 can produce a clock pulse for flip flop 37 when, subsequently, the write gate signal goes up (=false) again. Thus, this signal EG (true or false) renders the interrupt circuit responsive to upswings as well as to downswings of the write gate signal.

The third operation (step 110) that ensues upon completion of metering the delay $T_k+CI$ is clearing of the interrupt latch 37. For this, a pulse is dervied from one of the port lines of the mocroprocessor, being connected to the clear input of the latch.

It will thus be appreciated that signal EG begins in an instant which is delayed following the issuance of the write gate signal by the host controller. The delay is equal to a period composed of the sum of the execution time of the program from the interrupt to the beginning of metering the delay, which is a rather small period in the order of less than 25 $\mu$sec. Added to this is the metered delay $T_k+C_1$. Typically, the delay may be 232 $\mu$sec for the outermost track (about 3.6" radius) and 420 $\mu$sec for the innermost track (about 2" diameter), for a spacing between the trailing edge of the gaps of $0.035 \text{ in.} \begin{array}{c} +0.003 \\ -0.002 \end{array}$ and an angular speed of 360 RPM for the disk or diskette.

Concurrently to turning on the erase transducers, the program continues to restore the content of the accummulator (111) so that the interrupted program is resumed. The resumed program is basically a loop for reconfirming the hold state and mode, and for continuously supervising the status of the equipment.

After the host has issued the last data bit, the write gate signal turns false again (up) to disable the write electronics. Additionally, the interrupt flip-flop 37 is triggered because again, the exlusive or gate 36 receives unequal inputs; the particular interrupt sequence starts anew. The sequence 102 through 105 is run through as before, but the test 106 finds that the write gate signal is no longer true, so that the interrupt sequence proceeds to a different branch.

At first (112), a sum is formed from the track number (or a number proportional thereto) to which another constant $C_2$ is added. This constant $C_2$ is different from the constant $C_1$ and reflects the difference in timing as far as the onset and cessation of guard band writing is concerned. As stated, the guard band write-erase operation must begin just a little ahead of that area of magnetizable surface which was disposed adjacent to the trailing edge of data write transducer 12, when writing began; the guard band write-erase must end just a little after the surface area has passed which was adjacent to the leading edge of the gap of transducer 13, when data writing ceased. Accordingly, the constant $C_2$ reflects the azimuthal spacing between the leading edge of the data transducer gap and the trailing edge of the erase transducer gaps, as erasing ceases thereat upon turning off of these erase transducers.

As per statement box 113, a delay is metered (counted down) using the number $T_k + C_2$ and at the end of this delay metering operation signal EG is dropped by the microcomputer. Accordingly, erasing ceases at a delay from the true-to-false change of the write gate signal, which delay is composed of the program execution time, of a longer constant period, and of a track variable period, so that, indeed, guard band writing/erasing ceases just a short distance after the end of the data writing record.

A special situation should be discussed briefly. It may occur (theoretically) that the write gate signal goes up again before actually the delayed erasing has begun. Usually, a recording process will not be that short. Nevertheless, this situation does not constitute an error situation as far as the equipment is concerned (though it could be made to present an error situation). It simply means that this early upswing of WG is not recognized until after EG begins, so that EG will end a little later. Analogously, after a write sequence with WG having gone up, so that the sequence and delay metering for the end of EG has begun, the write gate could go down again before EG has gone up and been terminated. Again, this means that the next erase gate signal and erase operation will begin a little later. That may be undesirable because the first portion of the new recording is now left without a guard band. One may eliminate this drawback in various ways. A simple one is to merely specify that sequential recordings, not accompanied by a continuing write gate signal, must be spaced by a period equal to or larger than the largest metered delay. Alternatively, one may abort the metering of the end of EG and just continue it. The WG signal is available to the computer for such an inspection.

The invention is not limited to the embodiments described above, but all changes and modifications thereof not constituting departures from the spirit and scope of the invention are intended to be included.

We claim:

1. In a disk drive system, in which a spinning magnetizable disk cooperates with radially positionable transducer means, which include an information write transducer next to which are positioned two guard band writing transducers whose gaps are disposed downstream from the gap of the information write transducer taken in relation to the spinning disk, the drive system provided for cooperation with a host equipment which furnishes data and a write gate signal accompanying the data flow, the drive system having means for receiving the write gate signal and means responsive to the data when furnished and operating the informtion with transducers, the improvement comprising:

a microcomputer, having interrupt inputs means further having storage means which contain numerical information identifying a track on the disk with which the information write transducer interacts;

first circuit means connected to the means for receiving the write gate signal and providing an interrupt into the interrupt input means each time the write gate signal changes;

program means included in the microcomputer and responsive to the interrupt and to the track identifying numerical information for generating a delay which is relatively shorter for a larger diameter of any of the tracks above which the write transducer is disposed, the delay being further depending upon whether the interrupt was caused by the beginning or by the end of the write gate signal; and means, including the microcomputer and being responsive to the delay as generated, for generating a control signal in the guard band transducers, the control signal having a track-variable phase in relation to the write gate signal, depending upon the delay as respectively produced by the microcomputer following the write gate signal beginning or end.

2. In a disk drive system, in which a spinning magnetizable disk cooperates with radially positionable transducer means, which include an information write transducer next to which are positioned two guard band writing transducers whose gaps are disposed downstream from the gap of the information write transducer taken in relation to the spinning disk, the drive system provided for cooperation with a host equipment which furnishes data and a write gate signal accompanying the data flow, the drive system having means for receiving the write gate signal and means responsive to the data when furnished and operating the information with transducers, the improvement comprising:

a microcomputer, having interrupt input means, further having storage means which contain numerical information identifying a track on the disk with which the information write transducer interacts;

first circuit means connected to the means for receiving the write gate signal and providing an interrupt into the interrupt input means each time the write gate signal changes;

program means included in the microcomputer responsive to the interrupt and to the track-identifying numerical information, for generating first and second delays, each of which being composed respectively of a first and second constant component and of a track-variable component which decreases for increasing the track radius; and means responsive to the first and second delays and connected to the guard band transducers for turning them on in response to the first delay and turning them off at the end of the second delay.

3. In a system as in claim 2, the improvement including additional means connected for feeding the write gate signal to the microcomputer, said program means interrogating the level of the signal.

4. In a system as in claim 2, the improvement of the program means generating the track variable delay component in proportion to the difference between the radii of an outermost track and the current track.

5. In a system as in claim 2, wherein the program means provides for an approximation of the delay to vary inversely proportional to the track radius.

6. In a system as in claim 2, the improvement further comprising, said microcomputer and said responsive means, providing a control signal having a first level following the first delay until elapse of the second delay, and a second level at other times, and means for feeding the control signal to said guard band transducers.

7. In a system as in claim 6 or 1, the improvement further comprising the first circuit means being responsive to said write gate signal and to said control signal to generate an interrupt signal.

8. A disk drive system which includes at least one transducer means for cooperation with a spinning disk, the transducer means being mounted on a carriage driven by a motor, the system including a drive circuit for the motor which includes a microcomputer, the microcomputer having interrupt means responsive to externally generated step pulses as well as to pulses identifying track crossings by the transducer means through operation of the carriage motor, the microcomputer including first program means responsive to the step and detent pulses to generate therefrom a speed command signal for driving the motor;

the transducer means including a write transducer and two guard band transducers disposed to write guard bands on the disk downstream from the location on the disk on which the write transducer records, the microcomputer including storage means holding a number identifying a track above which the write transducer is located, the drive system including further means for receiving externally generated data for recording and for receiving a write gate signal accompanying the data, the improvement comprising:

an interrupt control circuit included in the means for receiving and connected to receive the write gate signal and generating an interrupt for the microcomputer for each change in the write gate signal level, so that interrupts are generated at the beginning and at the end of the write gate signal;

second program means included in the microcomputer and being responsive to the interrupts as generated by the write gate signal changes to generate a first delay in response to an interrupt at the beginning of a write gate signal and a second delay in response to an interrupt at the end of the write gate signal;

third program means included in the second program means for generating, for inclusion in said delays, a component which depends on the track-identifying number, to obtain shorter or longer first and second delays for tracks being located on the disk more radially outwardly or inwardly; and means connected to the guard band transducers for turning them on following each first delay and off following each second delay.

9. A system as in claim 8, the improvement further comprising the first and second program means providing for a lower priority in the response to any interrupt generated in response to the write gate signal.

10. A disk drive system which includes at least one transducer means for cooperation with a spinning disk, the transducer means being mounted on a carriage driven by a motor, the system including a drive circuit for the motor which includes a microcomputer, the microcomputer having interrupt means responsive to externally generated step pulses as well as to pulses identifying track crossings by the transducer means through operation of the carriage motor, the microcomputer including first program means responsive to the step and detent pulses to generate therefrom a speed command signal for driving the motor;

the transducer means including a write transducer and two guard band transducers disposed to write guard bands on the disk downstream from the location on the disk on which the write transducer records, the drive system including further means for receiving externally generated data for recording and for receiving a write gate signal accompanying the data, the improvement comprising:

an interrupt control circuit included in the means for receiving and connected to receive the write gate signal and generating an interrupt for the microcomputer for each change in the write gate signal level, so that interrupts are generated at the beginning and at the end of the write gate signal;

means included in the microcomputer for holding a numeral representation of the track with which the write transducer coacts upon receiving the data for reading;

means including second program means in the microcomputer and being responsive to said numerical track representation for generating a control signal of variable phase in relation to the write gate signal, the phase being dependent upon said track representation to be larger for tracks of smaller radii; and means connected for controlling the guard band transducers in response to said control signal.

11. In a disk drive system, in which a spinning, magnetizable disk cooperates with radially positionable transducer means which include an information write transducer, next to which are positioned two guard band writing transducers whose gaps are disposed downstream from the gap of the information write transducer, taken in relation to the spinning disk, the drive system provided for cooperation with a host equipment which furnishes data and a write gate signal accompanying the data flow, the drive system having means for receiving the write gate signal and means responsive to the data when furnished, and operating the information with transducers, the improvement comprising:

a microcomputer connected to receive the write gate signal;

means included in the microcomputer holding numerical identification of the track with which the write transducer coacts upon receiving data for recording;

means, including program means included in the microcomputer responsive to said identification and to said write gate signal to generate a control signal having a variable phase and duration to the write gate signal, depending upon the identification, to be delayed more and to last longer for a shorter track radius as identified; and means connected to control the guard band transducers in response to the control signal.

12. A disk drive system which includes at least one transducer means for cooperation with a spinning disk, the transducer means being mounted on a carriage driven by a motor, the system further including a drive circuit for the motor which moves the carriage transducer into different positions by operation of a speed feedback loop operating in response to digital signals, and which holds the transducer above a particular track by operation of a second feedback loop, the drive circuit including means for storing digital information identifying the track above which the transducer means is being held, the transducer means including an information write transducer and two guard band transducers disposed to write guard bands on the disk along the information recorded by the write transducer and downstream from the location on which the information write transducer records, the drive system further including means for receiving information data for writing and means for receiving a write gate signal accompanying the data, the improvement comprising:

circuit means connected to be responsive to the write gate signal and generating a control signal whose beginnings and end are delayed respectively from the beginning and end of the write gate signal by first and second delays;

means included in the circuit means and responsive to the stored track-identifying information for metering the first and second delays in dependance thereon, so that said first delays as well as said second delays are shorter for increasing the radial distance of the track as identified; and means for providing said control signal to said guard band transducers for controlling the operation thereof.

* * * * *